US007760873B2

(12) United States Patent
Gueron et al.

(10) Patent No.: US 7,760,873 B2
(45) Date of Patent: Jul. 20, 2010

(54) METHOD AND A SYSTEM FOR A QUICK VERIFICATION RABIN SIGNATURE SCHEME

(75) Inventors: Shay Gueron, Haifa (IL); Vinodh Gopal, Westboro, MA (US)

(73) Assignee: Intel Corporation, Santa Clara, CA (US)

( * ) Notice: Subject to any disclaimer, the term of this patent is extended or adjusted under 35 U.S.C. 154(b) by 1055 days.

(21) Appl. No.: 11/479,100

(22) Filed: Jun. 30, 2006

(65) Prior Publication Data

US 2008/0002825 A1    Jan. 3, 2008

(51) Int. Cl.
*H04L 9/30* (2006.01)
(52) U.S. Cl. .............................. 380/30; 380/28; 380/44; 380/45; 380/277; 713/180
(58) Field of Classification Search ................ 380/30
See application file for complete search history.

(56) References Cited

U.S. PATENT DOCUMENTS

| 5,299,263 | A | * | 3/1994 | Beller et al. | ................. | 380/30 |
| 6,097,813 | A | * | 8/2000 | Vanstone et al. | ............. | 380/30 |
| 6,266,771 | B1 | * | 7/2001 | Bellare et al. | ............... | 713/176 |
| 2007/0124602 | A1 | * | 5/2007 | Wald et al. | ................ | 713/193 |

OTHER PUBLICATIONS

Ateniese, G., 'Verifiable Encryption of Digital Signatures and Applications', 2004 ACM 1094-9224/04/0200-0001,ACM Transactions on Information and System Security, vol. 7, No. 1, Feb. 2004, pp. 1-20, http://www.cs.jhu.edu/~ateniese/papers/tissec.pdf.*

Ateniese, G., et al, 'Stateless-Recipient Certified E-mail System based on Verifiable Encryption', 2002, Dept. of Computer Science, The Johns Hopkins University, entire document, http://homes.cerias.purdue.edu/~crisn/papers/rsa2002_turms.pdf.*

* cited by examiner

*Primary Examiner*—Edan Orgad
*Assistant Examiner*—Ronald Baum
(74) *Attorney, Agent, or Firm*—Blakely, Sokoloff, Taylor & Zafman LLP (57) ABSTRACT

A method and a system to perform a Quick Verification of a Rabin Signature (QVRS) is provided. In one embodiment, the signing party generates a Rabin signature S of an original message M using a public key N in the Rabin signature generating formula $M=S^2$ mod N. In one embodiment, the signing party also generates a value q according to the formula $q=\text{floor}(S^2/N)$. In one embodiment, the signing party sends the original message M, the signature S, the public key N and the value q to the verifying party. In one embodiment, the verifying party verifies the integrity of the message M using the signature S, the public key N and the value q and the test equation $M=S^2-qN$.

21 Claims, 7 Drawing Sheets

```
Init:
ACC[2:0] = 0;                                          510

520
for (col=0; col <= 2*(t-1); col++){ if (col < t) {min_indx=0;    max_indx = col; M_LSW = M[col]; } else {min_indx = 1+col-t;  max_indx = t-1; M_LSW =0; }
  530
    TMP[2:0] = 0;

for(i= min_indx, j = max_indx;

i <= max_indx;              540 i++, j--;) { p[2:0] = q[i]*N[j];       TMP[2:0] = TMP[2:0] + p[2:0];

if (i<=j) { p[2:0] = a[i]*a[j]; ACC[2:0] = ACC[2:0] + p[2:0]; }
                                                                              560
        if (i<j) {                      ACC[2:0] = ACC[2:0] + p[2:0]; }

}
                                            570
    ACC[2:0] = ACC[2:0] - TMP[2:0];
                                                   580
    if (ACC[0] != M_LSW) {return FAILED;}
                                              590
    ACC = ACC >> w;

}
return PASSED;
```

FIG. 5

Init:

ACC = M; ACC2 = 0;   // initialize the 2t word vectors with correct data for (col=0; col <= 2*(t-1); col++){ if (col < t) {min_indx=0;    max_indx = col;} else {min_indx = 1+col-t;   max_indx = t-1;} for(i= min_indx, j = max_indx;

i <= max_indx;

i++, j--;) { p[1:0] = q[i]*N[j];          accumulate(ACC);

if (i<=j) { p[1:0] = a[i]*a[j]; accumulate(ACC2);} if (i<j) {                   accumulate(ACC2);}

} if (ACC[0] != ACC2[0]) {return FAILED;}
    // increment ACC, ACC2 pointers by 1 word each
} return PASSED;

void accumulate(word* ACC_ptr){ // add p[1:0] double-word into the ACC_ptr array
    ACC_ptr[0] += p[0];
    ACC_ptr[1] = ADDC(ACC_prt[1], p[1]);        // ADDC instr adds with carry-input
    for(i=2; if_carry_set; i++){INCR(ACC_ptr[i]);} // increment instr adds 1 to operand
}

METHOD AND A SYSTEM FOR A QUICK VERIFICATION RABIN SIGNATURE SCHEME

FIELD OF THE INVENTION

Embodiments of the invention relate to the field of data integrity, and in particular, to generating and verifying a digital signature for a message or data file.

BACKGROUND OF THE INVENTION

When a party receives a message or a data file (both referred to as messages hereinafter) this receiving party may wish to verify the integrity of the message to verify that the message has not been tampered with since it left the possession of the sending party, to verify the authenticity of the message, and to the prevent later repudiation by the sending party. Digital signatures are a known technology that satisfy all three reasons for verifying message integrity.

Most known digital signature systems use public key signature systems, where a digital signature is a number that is generated by the signing party with an algorithm that uses as input the content of the message and one or more secret numbers, known as the private keys of the system. One or more public keys are generated by the signing party and made known to the verifying party, whom may use them in combination with the signature to verify the message's integrity. A third party, trusted by both the sending and receiving parties, may certify the public keys as bound to the identity of the signing party. Once in possession of a certified public key, the verifying party can verify that a message sent with a signature was in fact sent by the party whom the public key was certified to and can verify that the message was not altered since it was signed.

The security of public key signature systems is not absolute, but such systems may be designed to be computationally secure. Computationally secure systems have theoretical vulnerabilities which a hypothetical forger could exploit, but the level of computational resources required to do so are judged to be far beyond those available to the hypothetical forger. Computationally secure systems often rely on the difficulty of solving certain mathematical problems. For example, the widely used Rivest—Shamir—Adlemen (RSA) signature scheme depends on the difficulty of factoring large integers. In the RSA scheme, the message signer/sender selects two large, distinct, prime numbers p and q. One of the public keys n, is product of the private keys p and q. The other public key e, is determined by the sender first computing the totient:

$$\phi(n)=(p-1)(q-1) \qquad \text{Equation 1}$$

The sender then chooses an integer e such that:

$$1<e<\phi(n) \text{ and } e \text{ coprime to } \phi(n) \qquad \text{Equations 2a and 2b}$$

The sender's private key d may then be determined by choosing an integer d such that:

$$1<d<\phi(n) \text{ and } ed \equiv 1 (\text{mod } \phi(n)) \qquad \text{Equations 3a and 3b}$$

The sender can then generate a signature for a message m by computing:

$$s=m^d \mod n \qquad \text{Equation 4}$$

With the public keys n and e, the verifying party can recover the message by computing:

$$m=s^e \mod n \qquad \text{Equation 5}$$

Solving Equations 1-4 is computationally feasible with known algorithms for parties in possession of the private keys p, q, and d. Solving the RSA verification formula (Equation 5) is computationally feasible with known algorithms for parties in possession of public keys e and n. However, to forge a signature using public key n without knowing the private key d requires the forger to factor the public key n or use some other method as equally difficult. This task can be made computationally infeasible if p and q are judiciously picked. Primarily, p and q should be large enough to overwhelm the factoring methods and computational resources available to potential forgers.

While making it more difficult for potential forgers, large p, q and e values may also increase the computational time for legitimate senders to generate signatures and receivers of signed messages to verify messages. For example, a currently typical RSA scheme may have public keys n=2048, and e=17. These values would require the RSA message verification formula (Equation 5) to perform 4 modular squares and 1 modular multiplication. Implementations of this example on current computer hardware will consume ~15 million core clock cycles and the time required falls in the millisecond scale.

Another known digital signature system is the Rabin signature scheme. Similar to the RSA scheme, the Rabin scheme starts with generating a public key N, which is product of P and Q, two large, distinct, prime numbers. However, the exponent in the Rabin message verification formula does not have to be odd and is usually set to 2:

$$M=S^2 \mod N \qquad \text{Equation 6}$$

The Rabin signature generation formula uses ½ for the exponent:

$$S=M^{1/2} \mod N \qquad \text{Equation 7}$$

The use of ½ as an exponent requires that message M be a quadratic residue modulo N. Stated differently, to create a Rabin signature there should exist a square root for the message M in modular arithmetic when the modulus is N. This will not be true for all messages that a sender may desire to send, so an additional stage may be used to transform any message that is not a quadratic residue modulo N to into a value that is. If one knows the values of the factors of N, (i.e. P and Q), efficient algorithms exist for solving the Rabin signature generation formula (Equation 7). However, with a judicious selection of N, the Rabin signature generation formula (Equation 7) can be made computationally infeasible for parties that do not possess the values of the factors of N, (i.e. P and Q).

The verification process of a Rabin signature system can require less computation than a similar RSA signature system. This is primarily due to the fact that modular squares may be performed more efficiently than modular multiplication. The RSA scheme with its odd exponents requires at least one modular multiplication. For example, to perform an RSA signature verification (Equation 5) with e=3 one modular square and one modular multiplication are performed. To perform a similar Rabin verification with e=2, only a modular square is performed. Even though the Rabin verification may be computed faster than a similar RSA verification, it still has the disadvantage of using modular arithmetic, which generally requires more computation time than regular, non-modular arithmetic.

BRIEF DESCRIPTION OF THE DRAWINGS

Embodiments of the present invention are illustrated by way of example and not limitation in the figures of the accompanying drawings, in which.

DETAILED DESCRIPTION

Embodiments of a method and a system for a Quick Verification Rabin Signature (QVRS) scheme are described. In the following description, for purposes of explanation, numerous specific details are set forth in order to provide a thorough understanding of embodiments of the present invention. It will be evident, however, to one skilled in the art that the present invention may be practiced without these specific details.

Figure 1:
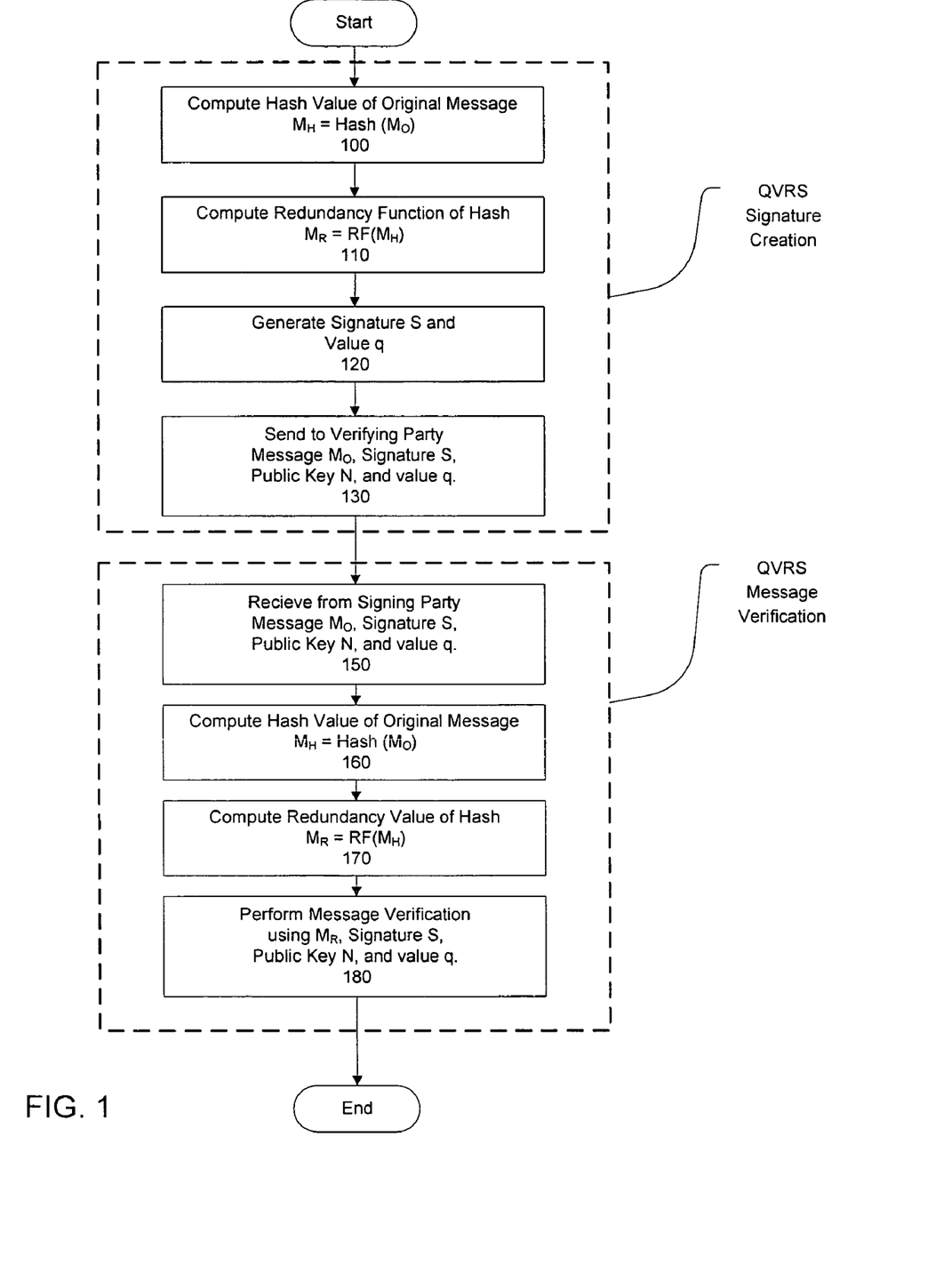
FIG. 1 shows a high level view of one embodiment of a method for QVRS signature creation and message verification.

FIG. 1 shows a high level view of one embodiment of a method for QVRS signature creation and message verification. Stages 100-130 show a QVRS signature creation process performed by a sending (signing) party and stages 150-180 show a QVRS message verification method performed by a receiving (verifying) party.

In stage 100, a signing party takes the original message $M_O$ that it wishes to sign and computes a hash value $M_H$ of the original message $M_O$ using a hash function (Equation 8). Then in stage 110, the signing party runs the hash value $M_H$ as an argument in a redundancy function (Equation 9a) resulting in a redundancy value $M_R$.

$$M_H = \text{Hash}(M_O) \quad \text{Equation 8}$$

$$M_{RF} = RF(M_H) \; M_H = RF^{-1}(M_{RF}) \quad \text{Equations 9a and 9b}$$

The purpose of stages 100 and 110 is to prevent a forger from reverse engineering forged signatures with someone else's public key. A forger with access only to another party's public key can run many possible signatures through the Rabin message verification formula (Equation 6). Even if the forger cannot get the correct signature for a specific message the forger would like to send, the forger can still cause harm to a verifying party in some circumstances. A random message that is generated by entering a random signature value into the Rabin message verification formula (Equation 6) may cause harm if the message and signature are sent to a verifying party that believes the message to be reliable information crucial to its operations and so relies on it.

The use of a hash function and a redundancy function (Equations 8, 9a) can prevent this type of forgery. A redundancy function (Equation 9a) may be chosen that greatly increases the number of possible signatures. With the possible signatures so greatly outnumbering the possible messages, most possible signatures have no corresponding message (e.g. $2^N-1$ possible signatures vs. N possible messages). Few values selected at random will yield a numerical result when entered as a possible signature value into the Rabin message verification formula (Equation 6), and then run through the Inverse redundancy function (Equation 9b). Most randomly chosen signatures will return an empty set.

Known hash functions (Equation 8) may be chosen to be computationally infeasible to reverse (e.g. SHA-1). That is, a computationally feasible inverse of such a hash function does not exist that can obtain the original message $M_O$ from a hash value $M_H$. Combined with the redundancy function (Equation 9a), the use of a hash function makes it computationally infeasible to find the corresponding messages to even the few randomly chosen signatures that return a numerical result when run through the message verification formula and the inverse redundancy function (Equation 9b). In one embodiment, the use of the hash function (Equation 8) means the original message $M_O$ cannot be recovered with the Rabin message verification formula (Equation 6), so the original message $M_O$ is provided to the verifying party and the verifying party has previously obtained possession of the hash and redundancy functions (Equations 8, 9a) used by the sender.

In stage 120, the sender generates a digital signature S from the redundancy value $M_R$. Details of this stage are explained in the discussion of FIG. 2.

In stage 130, the signing party sends to the verifying party the original message $M_O$, as well as values generated in stage 120, including the signature S, the public key N, and the value q. In other embodiments the verifying party is already in possession of the public key N, so the signing party does send it.

Stage 150 marks the beginning of the QVRS message verification method. In stage 150, the verifying party receives the values sent by the signing party in stage 130, including the original message $M_O$, including the signature S, the public key N, and the value q. In this embodiment, the verifying party is assumed to already be in possession the same hash function (Equation 8) and the same redundancy function (Equation 9a), that the signing party used, but in other embodiments, they may not be previously known to the verifying party and are sent along with the signature.

In stage 160, the verifying party computes the hash value $M_H$ of the original message $M_O$ using the same hash function (Equation 8) as the signing party used.

In stage 170, the verifying party computes the redundancy value $M_R$ of the hash value $M_H$ using the same redundancy function (Equation 10) as the signing party used.

In stage 180, the verifying party verifies the integrity of the original message $M_O$ using the redundancy value $M_R$, Signature S, public key N and value q. Details of two embodiments of this stage are covered in the discussion of FIGS. 3 and 4.

Figure 2:
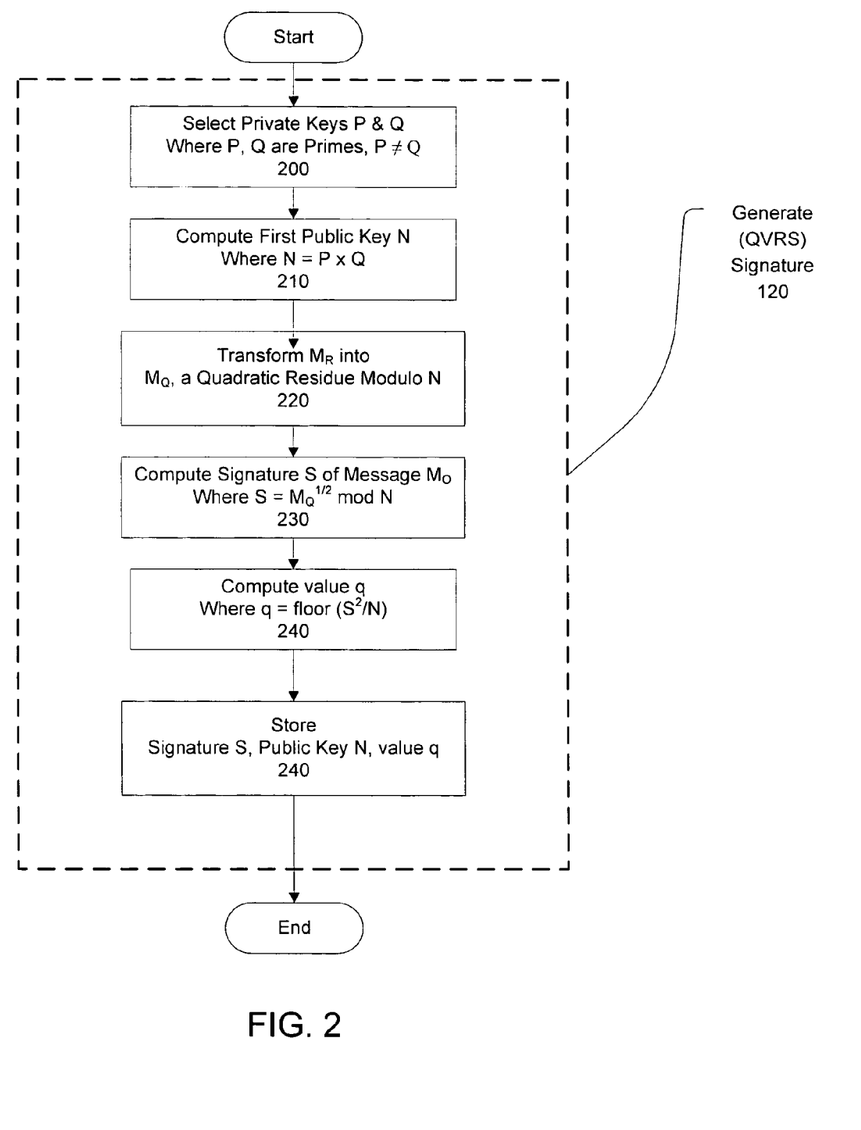
FIG. 2 shows one embodiment for a method to generating a Rabin signature and the value q needed for quick verification.

FIG. 2 shows one embodiment of a method to generate a Rabin signature and the value q needed for quick verification. Stages 200-240 are one embodiment to carry out the details stage 120. In stage 200, the signing party selects the private keys P and Q. The values of P and Q should be prime integers and distinct (i.e. P not equal Q). The values of P and Q selected should be large enough to overwhelm the factoring methods and computational resources available to potential forgers. While distinct, the values of P and Q selected should be nearly equal. In some embodiments, new values of P and Q are not be selected every time the signing party wishes to generate a signature, but rather the same values of P and Q may be used for signing many messages.

In stage 210, the signing party computes the public key N. The value of N is equal to the product of P and Q. The value of N will become the modulus for any modular arithmetic computations that are performed in generating a signature. In some embodiments, a new value of N is not be computed every time the signing party wishes to generate a signature, but rather the same value of N may be used for signing many messages.

In stage 220, the signing party transforms redundancy value $M_R$ into $M_Q$, a quadratic residue modulo N using a transformation algorithm. To create a Rabin signature for any message, there should exist a square root for that message in modular arithmetic when the modulus is N (i.e. the message should be a quadratic residue modulo N). In this embodiment, the verifying party tests $M_R$ and if $M_R$ is already a quadratic residue modulo N, then $M_Q$ can merely take the value of $M_R$. If $M_R$ is not a quadratic residue modulo N, then the value of $M_R$ is transformed into a quadratic residue modulo N. In one embodiment the transformation algorithm may comprise taking the exclusive-OR (XOR) of the redundancy value $M_R$ with an initial vector, then testing again if the result is a quadratic residue modulo N. If it is not, then the signing party takes the result of the previous XOR and XORs it again with the initial vector, tests again and repeats until a quadratic residue modulo N results, which is then assigned as the value of $M_Q$.

In stage 230, the signing party computes a signature S that may be used by a verifying party to verify message $M_O$. The sender uses the value of $M_Q$ in the standard Rabin signature creation formula (Equation 7) to obtain the signature S.

In stage 230, the signing party computes a value q using the formula:

$$q = \text{floor}(S^2/N) \qquad \text{Equation 10}$$

Value q may be used by a verifying party to reduce the computation effort required to perform a message verification check. No new information is reveled by providing value q, because given signature S and public key N, anyone can compute value q in polynomial-time. Some of effort of the computation saved by the verifying party is "redistributed" to the signing party in the generation of the value q.

In stage 240, the signing party stores signature S, public key N, and value q. These stored values are then ready to be sent to a verifying party.

Figure 3:
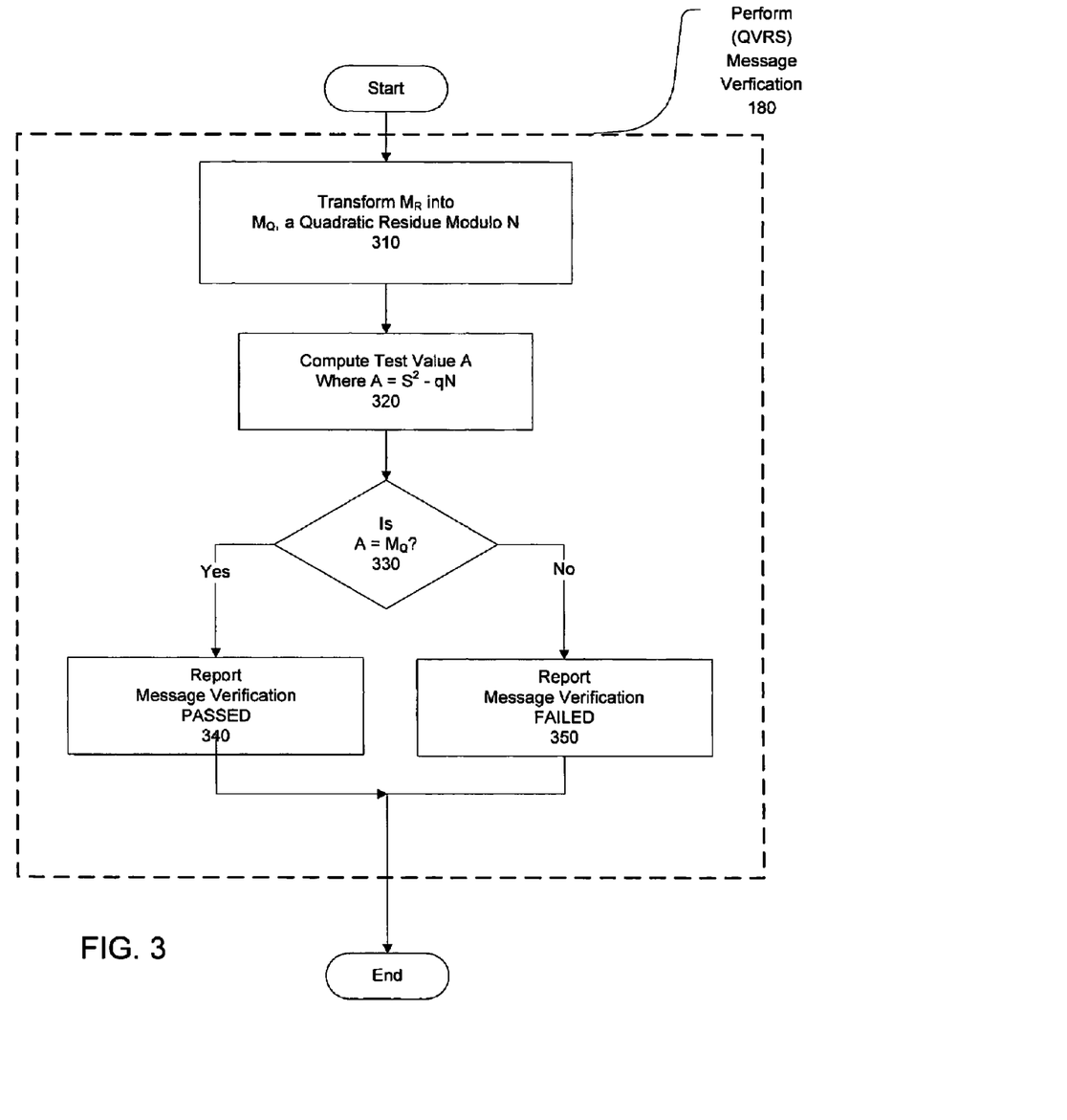
FIG. 3 shows one embodiment of a method for QVRS message verification that uses only non-modular arithmetic.

FIG. 3 shows one embodiment of a method for QVRS message verification that does not use modular arithmetic. This embodiment carries out the details of stage 180. Prior to stage 180, the verifying party has received the values of $M_O$, S, N and q and has computed the redundancy value $M_R$ from the original message $M_O$. In stage 310, the verifying party transforms redundancy value $M_R$ into $M_Q$, a quadratic residue modulo N using a transformation algorithm. In this embodiment the verifying party has previously obtained the transformation algorithm used by the signing party, which the verifying party uses with redundancy value $M_R$ to determine the value of $M_Q$. The verifying party should thus obtain the same result for $M_Q$ as did the signing party.

In stage 320, the verifying party computes a test value A according to the QVRS test equation:

$$A = S^2 - qN \qquad \text{Equation 11}$$

Equation 11 is the mathematical equivalent the Rabin message verification formula (Equation 6), combined with the value q (computed with Equation 10) and the mathematical identity:

$$S^2 \bmod N = S^2 - qN \qquad \text{Equation 12}$$

In some embodiments, the QVRS test equation (Equation 11) is more efficient than the standard Rabin verification equation (Equation 6) because it does not use modular arithmetic. One of the fastest methods to compute the modular square in Equation 6 is by computing one Montgomery multiplication and one Montgomery square, the algorithms for which would require more than one integer square, three integer multiplications and two additions. In contrast, the QVRS test equation (Equation 11) may be computed with only one integer square, one integer multiplication and one addition.

In stage 330, the test value A is compared to the value of the message quadratic residue $M_Q$. If the test value A is equal to the value of the message quadratic residue $M_Q$ then stage 340 is performed which reports that the message verification passed. If the test value A is not equal to the value of the message quadratic residue $M_Q$ then stage 350 is performed which reports that the message verification failed.

A numerical example may be helpful to understand the embodiment described in stages 200-240 and 310-350. The parameters chosen here are artificially small to aid the understanding of the reader. For the signature scheme described, much larger values would need to be selected for the signature to be computationally security. Preceding stage 200, a signing party with a message to sign has sent the original message $M_O$ through the hash and redundancy functions of stages 100-110 to yield a redundancy value of $M_R$=4003997. In stage 200, the signing party selects private keys P and Q. In this case, the signing party selects P=2003 and Q=1999, which meet the mathematical criteria of being prime and distinct. That P and Q are near to each other in value will also enhance the computational security of the signatures. In stage 210, the signing party computes the public key N=P×Q=24003997. In stage 220, the signing party transforms the redundancy value $M_R$ into $M_Q$, a quadratic residue modulo N. In this embodiment, the transformation algorithm is the one given as an example in the detailed description of stage 220, where the transformation algorithm repeatedly tests and XORs the redundancy value $M_R$ until it is a quadratic residue modulo N. In this case, the signing party merely has to test $M_R$ and discover that it already is a quadratic residue modulo N. Zero iterations of the XOR function are required in this case and the signing party assigns the value of $M_R$ to $M_Q$. In stage 230, the signing party computes the signature S according to the Rabin signature generation formula (Equation 7) using a known computationally efficient algorithm to yield S=22244. In stage 240, the signing party computes the value q according to Equation 10 yielding q=123. In stage 240, the signing party stores the values S, N, $P_T$, q in preparation for sending these values to a verifying party.

The example continues with a verifying party verifying the message that the signing party has signed using QVRS. After the verifying party is in possession of values S=22244, N=24003997, $P_T$=0, q=123, as well as the original message $M_O$, the verifying party computes the redundancy value $M_R$ from the original message $M_O$ in stages 150-170. In this embodiment, the verifying party had prior knowledge of the hash and redundancy functions that the signing party used, so it should arrive at the same result. In stage 310, the verifying party transforms the redundancy value $M_R$ into $M_Q$. In this embodiment, the verifying party had prior knowledge of the transformation algorithm and initial vector that the signing partner uses, so it arrives at the same result—determining that $M_R$ already is a quadratic residue modulo N and that zero iterations of the XOR function are required in this case. The verifying party assigns the value of $M_R$ to $M_Q$. In stage 320, the verifying party computes test value A according to the QVRS test equation (Equation 11), which yields:

$$A=S^2-qN=(22244)^2-(123)(24003997)=494795536-492491631=2303905$$

In stage 330, the verifying party compares test value A with $M_Q$ and finds them equal. This result indicates that stage 350 should be ignored, and that stage 340 is the correct choice. The verifying party performs stage 340 and reports that the message verification has passed.

Figure 4:
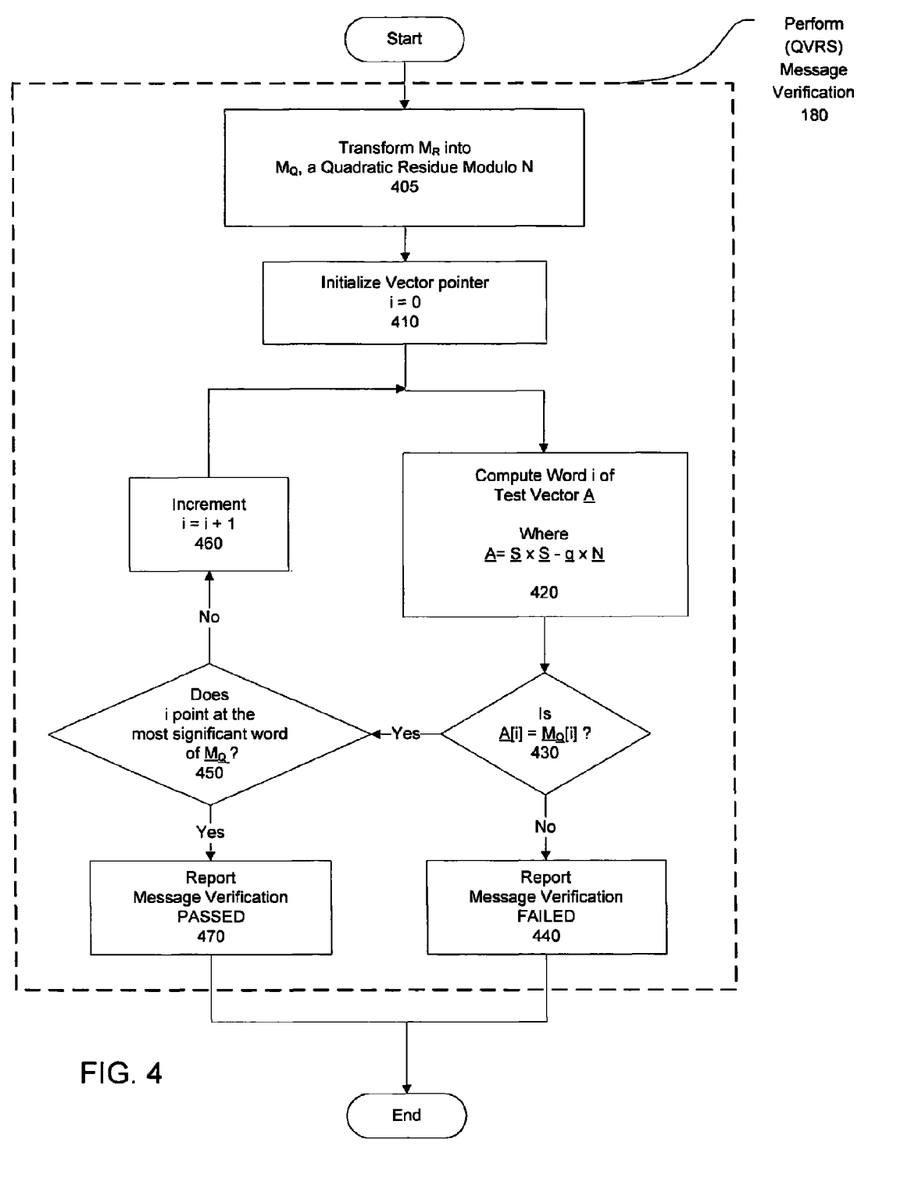
FIG. 4 shows another embodiment of a method for QVRS message verification that does not use modular arithmetic and computes one word at a time, then pauses to check for verification failure.

FIG. 4 shows another embodiment of a method for QVRS message verification that does not use modular arithmetic and computes one word at a time, then pauses to check for verification failure. This embodiment carries out the details of stage 180. Prior to stage 180, the verifying party has received the values of $M_Q$, S, N and q and has computed the redundancy value $M_R$ from the original message $M_O$. In stage 405, the verifying party transforms redundancy value $M_R$ into $M_Q$, a quadratic residue modulo N in a manner essentially the same as described in stage 310. In stage 410, the verifying party starts to compute the test value A using the QVRS test equation (Equation 11), but instead of computing the entire value of A before comparing it to $M_Q$, as was done in stages 320-330, the verifying party computes A one word at a time, pausing after each word and testing that word of A against the word $M_Q$ that has the same level of significance. In stage 410, the vector pointer i is set to point initially at the least significant words of A and $M_Q$. In the first iteration of stage 420, the verifying party computes the least significant word of test vector A. In stage 430, the verifying party compares the least significant word of A against the least significant word of $M_Q$. If the least significant word of A does not equal the least significant word of $M_Q$, there is no point in doing further computations since there is no possibility that A can equal $M_Q$. Consequently stage 440 is chosen as the next stage, reporting the message verification failed. If the least significant word of A is found to be equal to the least significant word of $M_Q$, the proper choice is for the verifying party to perform stage 450. In stage 450, the verifying party determines if the entire value of A has been computed and each word has been found equal to the corresponding word of $M_Q$. If so, then stage 470 is the proper choice and the verifying party reports that message verification has passed. Otherwise, the proper choice is stage 460, where the vector pointer i is incremented and the method loops back to stage 420 to compute the next least significant word of test value A.

Figure 5:
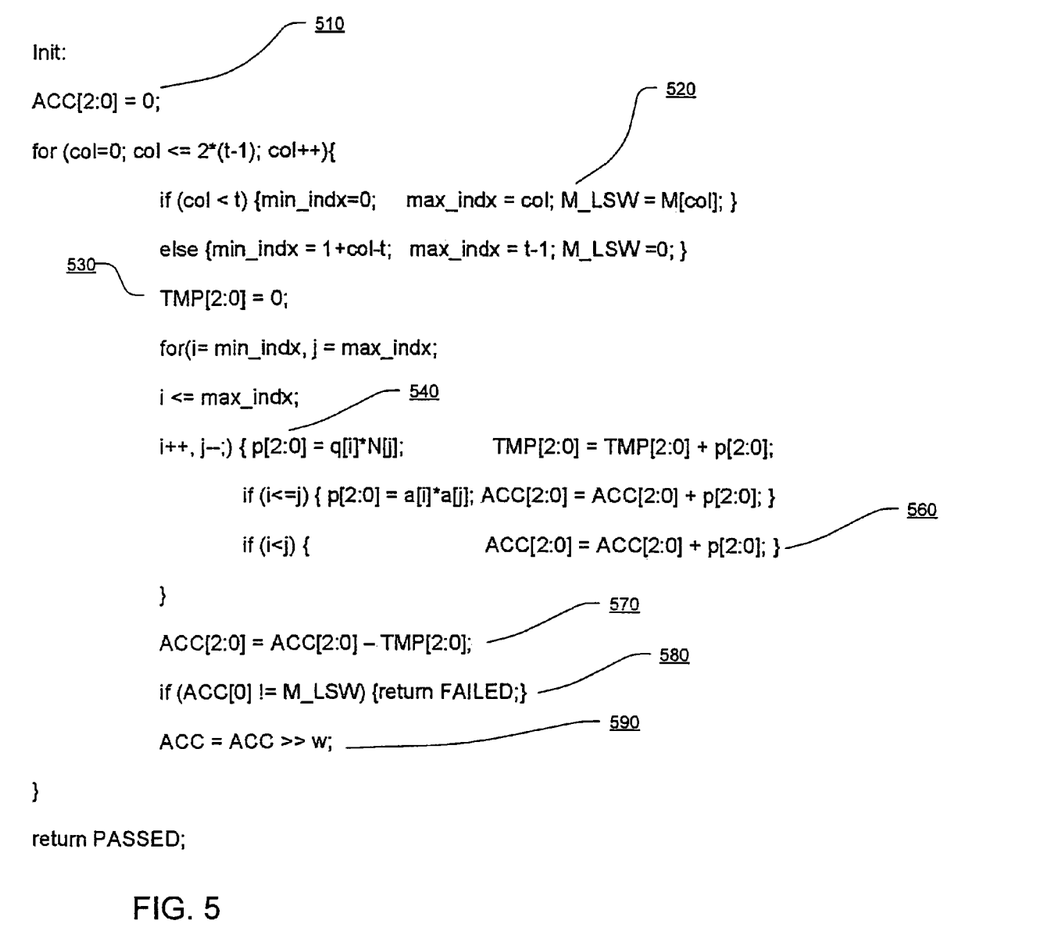
FIG. 5 shows a pseudo-code algorithm that may be used to carry out the QVRS message verification method embodied in FIG. 4.

FIG. 5 shows a pseudo-code algorithm that may be used to carry out the QVRS message verification method embodied in stages 405-470. The algorithm assumes word-size to be w bits and that each vector {A, q, N, M} has t words. ACC and TMP are arrays of exactly 3 words each. The algorithm assumes that $\log_2(t)$ is much smaller than w, e.g. w=32, t=64 (for modulus size 2048 bits). The algorithm assumes that there exists an instruction to perform an unsigned multiplication of 2 word operands and efficiently store the result in a double-word. The word data-types are unsigned integers, which allows the vector subtractions to be explicitly done via 1s-complement and increment operations. At a given point in the processing, ACC[ ] 510 holds the signed number representing partial results from the operation $(S^2-q\times N)$, with ACC[0] holding the particular word under consideration at a particular point in the processing. The variable M_LSW 520 holds the particular word of message $M_Q$ under consideration at a particular point in the processing. The vector TMP[ ] 530 accumulates the value of $q\times N$ for word of ACC[ ] under consideration at a particular point in the processing. The three word vector p[ ] 540 temporarily holds the product of two single words, either of a word of q and a word of N 540 or of a word of S and a word of S 550. Note that p[2] is always zero because the product of two single word values can only be two words long. After the subtraction of TMP[2:0] from ACC[2:0] 570, the vector ACC[0] holds the value of $S^2-q\times N$ for the word under consideration. The subtraction 570 may be performed by adding to ACC[2:0] the value of the one's complement of TMP[2:0], then incrementing the result. When the least-significant word under consideration ACC[0] is retired 580, it should equal the corresponding word of M or the verification fails 570. The retiring of the least-significant word under consideration ACC[0] 580 can be optimized as copying ACC[1] to ACC[0], copying ACC[2] to ACC[1], and filling in ACC[2] with zeros or ones depending on the most significant bit of ACC[1].

Figure 6:
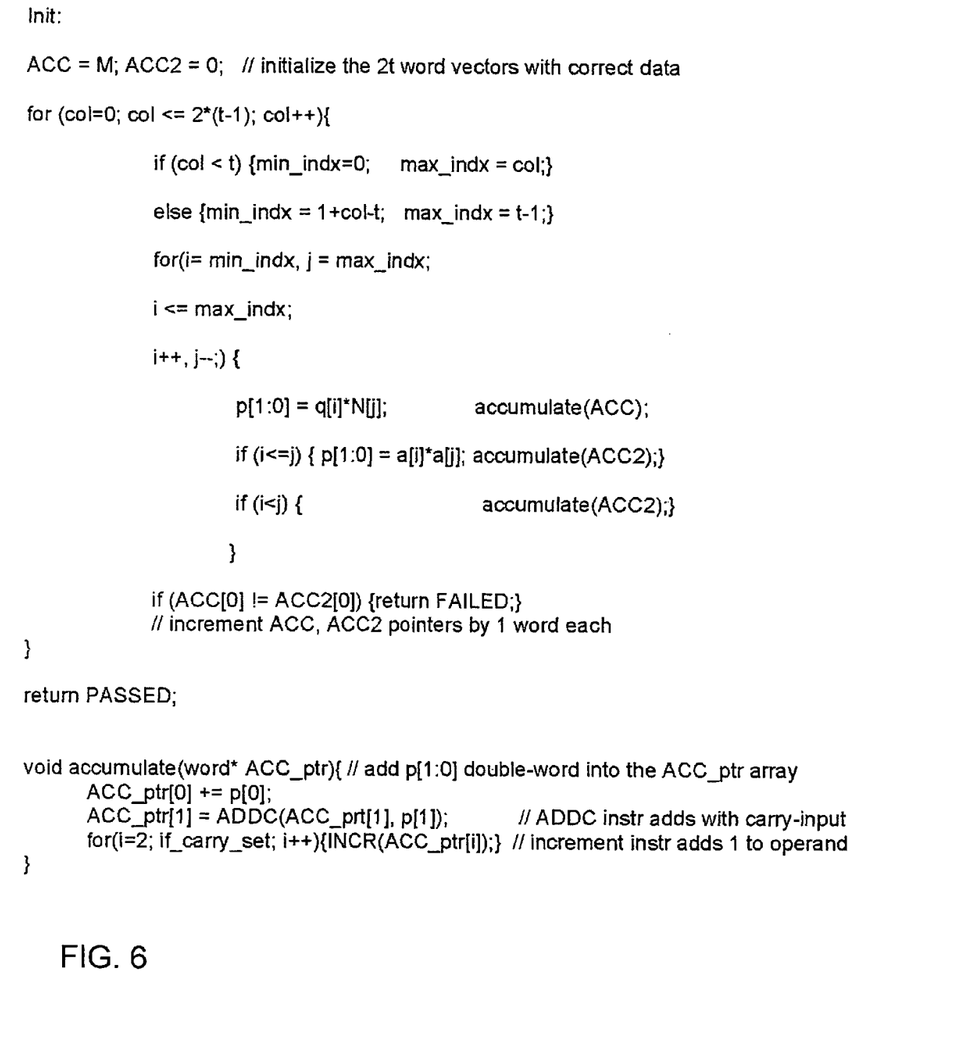
FIG. 6 shows an alternative pseudo-code algorithm that may be used to carry out the QVRS message verification method embodied in FIG. 4.

FIG. 6 shows an alternative pseudo-code algorithm that may be used to carry out the QVRS message verification method embodied in stages 405-470. This algorithm is more complex, but more general purpose than the algorithm in FIG. 5. Two large accumulators, ACC and ACC2 are used to store the complete values of $S^2$ and $q\times N$ respectively.

Figure 7:
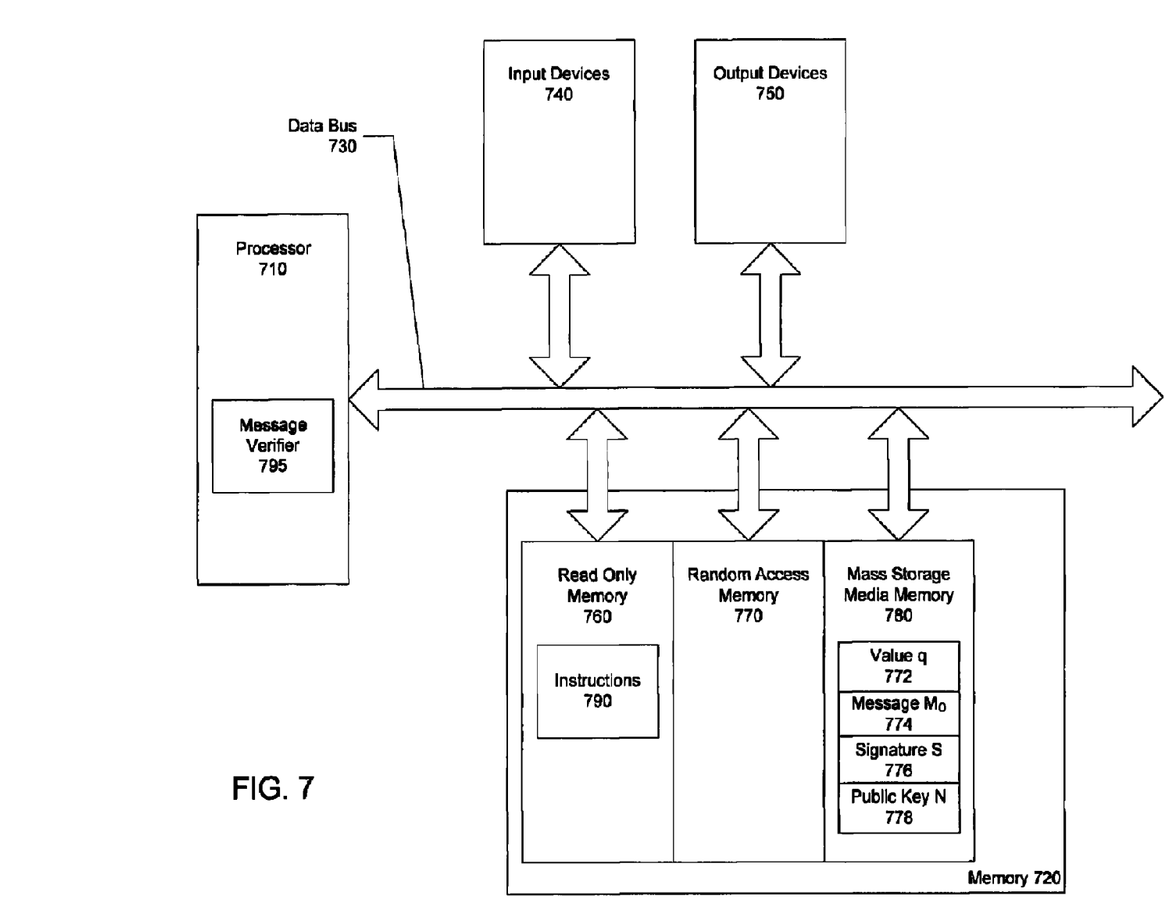
FIG. 7 shows one embodiment for a system to verify messages using QVRS.

FIG. 7 shows one embodiment for a system to verify messages using QVRS. In one embodiment, a computer processor 710 is coupled with a memory 720 through a data bus 730. The memory 720 includes one or more memory devices, which may include a read only memory (ROM) 760, a random access memory (RAM) 770, and a mass storage media memory 780. In some embodiments, the processor 710 is also coupled with one or more input devices 740. In some embodiments, the processor 710 is coupled with one or more output devices 750. In some embodiments, instructions 780 detailing how to carry out a QVRS message verification method such as the method embodied in FIG. 3 or the method embodied in FIG. 4, are placed in a machine-readable non-transitory medium coupled with the processor. FIG. 7 shows the instructions 780 contained in the read only memory 750, but the instructions 780 may be contained in other machine-accessible non-transitory media. In one embodiment, a message verifier 795 runs on the processor 710, to verify message $M_o$ 774, accessing and using message $M_o$ 774, value q 772, signature S 776, and public key N 778 in the processes of verification. FIG. 7 shows the value q 772, message $M_o$ 774, signature S 776, and public key N 778 contained in the mass storage media memory 750, but in other embodiments, each one may be contained in other machine-accessible non-transitory media.

A machine-accessible non-transitory medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable/non-recordable media, such as read only memory (ROM) 750; random access memory (RAM) 760; and mass storage media memory 770, such as magnetic disk storage media; optical storage media; flash memory devices; etc.

What is claimed is:

1. In a computing device for computing digital signatures, a method comprising: generating, via a computing device, a value P and a value Q, wherein P and Q are distinct prime numbers; computing, via a computing device, a value public key N, wherein public key N is equal to the product of values P and Q; accessing, via a computing device, a value MQ, wherein MQ is a number that has a square root in modular arithmetic when the modulus is public key N; and wherein accessing the value MQ comprises: computing a hash value MH, wherein MH is a result of a hash function with an original message MO as an argument; computing a redundancy value MR, wherein MR is a result of a redundancy function with MH as an argument; and transforming MR into the value MQ; computing, via a computing device, a value signature S, wherein signature S is equal to the square root of MQ in modular arithmetic when the modulus is public key N; computing, via a computing device, a value q, wherein q is equal to the largest integer less than or equal to the quotient of signature S squared divided by public key N; and storing signature S, public key N, and value q in a storage medium of the computing device; performing, via the computing device, a message verification, using signature S, value MQ, public key N and value q; reporting, via an output device of the computing device, a message verification status indicating the message verification passed or failed based on the message verification performed.

2. The method of claim 1, wherein transforming MR into the value MQ comprises performing an exclusive-or function with MR and an initial vector as arguments.

3. In a computing device for computing digital signatures, a method comprising: accessing, from a storage medium of the computing device, a value N, wherein N is the product of values P and Q, wherein P and Q are distinct prime numbers; accessing, from the storage medium of the computing device, a value MQ, wherein MQ is a number that has a square root in modular arithmetic when the modulus is N; and wherein accessing the value MQ comprises: computing a hash value MH, wherein MH is a result of a hash function with an original message MO as an argument; computing a redundancy value MR, wherein MR is a result of a redundancy function with MH as an argument; and transforming MR into the value MQ; accessing, from the storage medium of the computing device, a value S, wherein S is the square root of MQ in modular arithmetic when the modulus is N; accessing, from the storage medium of the computing device, a value q, wherein q is the largest integer less than or equal to the quotient of S squared divided by N; and performing, via the computing device, a message verification, using S, MQ, N and q.

4. The method of claim 3, wherein performing the message verification comprises executing arithmetic algorithms wherein the arithmetic is all non-modular arithmetic.

5. The method of claim 3, wherein performing the message verification comprises:
  computing a value A equal to the square of S minus the product of q and N; and
  reporting the message verification failed when A is not equal to MQ and reporting the message verification passed when A is equal to MQ.

6. The method of claim 5, wherein computing the value A comprises:
  dividing A and MQ into words;
  computing each word of A sequentially, wherein the words are computed in order of increasing significance; and
  terminating the computing for each word of A not equal to the word of MQ having the same significance.

7. The method of claim 3, wherein transforming MR into the value MQ comprises performing an exclusive-or function with MR and an initial vector as arguments.

8. An article of manufacture comprising: a machine-accessible non-transitory storage medium including data that, when accessed by a machine, cause the machine to perform operations comprising, generating a value P and a value Q, wherein P and Q are distinct prime numbers; computing a value N, wherein N is equal to the product of values P and Q; accessing a value MQ, wherein MQ is a number that has a square root in modular arithmetic when the modulus is N; and wherein accessing the value MO comprises: computing a hash value MH.

9. The article of manufacture of claim 8, wherein transforming MR into the value MQ comprises performing an exclusive-or function with MR and an initial vector as arguments.

10. The article of manufacture of claim 8, wherein the machine-accessible medium further includes data that causes the machine to perform operations comprising:
  writing q on a mass storage media memory.

11. An article of manufacture comprising: a machine-accessible non-transitory storage medium including data that, when accessed by a machine, cause the machine to perform operations comprising, accessing a value N, wherein N is the product of values P and Q, wherein P and Q are distinct prime numbers; accessing a value MQ, wherein MQ is a number that has a square root in modular arithmetic when the modulus is N; and wherein accessing the value MQ comprises: computing a hash value MH, wherein MH is a result of a hash function with an original message MO as an argument; computing a redundancy value MR, wherein MR is a result of a redundancy function with MH as an argument; and transforming MR into the value MQ; accessing a value S, wherein S is the square root of MQ in modular arithmetic when the modulus is N; accessing a value q, wherein q is the largest integer less than or equal to the quotient of S squared divided by N; and performing a message verification, using S, MQ, N and q.

12. The article of manufacture of claim 11, wherein performing the message verification comprises executing arithmetic algorithms wherein the arithmetic is all non-modular arithmetic.

13. The article of manufacture of claim 11, wherein performing the message verification comprises:
  computing a value A equal to the square of S minus the product of q and N; and
  reporting the message verification failed when A is not equal to MQ and reporting the message verification passed when A is equal to MQ.

14. The article of manufacture of claim 13, wherein computing the value A further comprises:
  dividing A and MQ into words;
  computing each word of A sequentially, wherein the words are computed in order of increasing significance; and
  terminating the computing for each word of A not equal to the word of MQ having the same significance.

15. The article of manufacture of claim 11, wherein accessing the value q comprises accessing the value q from a mass storage media memory.

16. A system for computing digital signatures comprising: a processor; a memory coupled with the processor; a machine-readable non-transitory storage medium coupled with the processor, wherein instructions stored upon the machine-readable non-transitory storage medium, when executed by the processor, cause the processor to perform a method comprising: accessing a value N, wherein N is the product of values P and Q, wherein P and Q are distinct prime numbers; accessing, from the machine-readable non-transitory storage medium of the system, a value MQ, wherein MQ is a number that has a square root in modular arithmetic when the modulus is N; and wherein accessing the value MQ comprises: computing a hash value MH, wherein MH is a result of a hash function with an original message MO as an argument; computing a redundancy value MR, wherein MR is a result of a redundancy function with MH as an argument; and transforming MR into the value MQ; accessing, from the machine-readable non-transitory storage medium of the system, a value S, wherein S is the square root of MQ in modular arithmetic when the modulus is N; accessing, from the machine-readable non-transitory storage medium of the system, a value q from the memory, wherein q is the largest integer less than or equal to the quotient of S squared divided by N; performing, via the processor of the system, a message verification, using S, MQ, N and q; and reporting, via an output device communicably interfaced with the system, a message verification status indicating whether the message verification passed or failed based on the message verification performed.

17. The system of claim 16, wherein performing the message verification comprises:
  computing a value A equal to the square of S minus the product of q and N; and
  reporting the message verification failed when A is not equal to MQ and reporting the message verification passed when A is equal to MQ.

18. The system of claim 17, wherein computing the value A further comprises:
  dividing A and MQ into words;
  computing each word of A sequentially, wherein the words are computed in order of increasing significance; and
  terminating the computing for each word of A not equal to the word of MQ having the same significance.

19. A system to verify digital signatures comprising: a processor; a memory coupled with the processor; a non-transitory storage medium; and a message verifier to run on the processor and having functionality to; access, from the non-transitory storage medium of the system, a value N, wherein N is the product of values P and Q, wherein P and Q are distinct prime numbers; access, from the non-transitory storage medium of the system, a value MQ, wherein MQ is a number that has a square root in modular arithmetic when the modulus is N; and wherein accessing the value MQ comprises: computing a hash value MH, wherein MH is a result of a hash function with an original message MO as an argument; computing a redundancy value MR, wherein MR is a result of a redundancy function with MH as an argument; and transforming MR into the value MQ; access, from the non-transitory storage medium of the system, a value S, wherein S is the square root of MQ in modular arithmetic when the modulus is N; access, from the non-transitory storage medium of the system, a value q from the memory, wherein q is the largest integer less than or equal to the quotient of S squared divided by N; perform a message verification, using S, MQ, N and q; and report, via an output device communicably interfaced with the system, a message verification status indicating whether the message verification passed or failed based on the message verification performed.

20. The system of claim 19, wherein the message verifier to perform the message verification comprises the message verifier to:
  compute a value A equal to the square of S minus the product of q and N; and
  report the message verification failed when A is not equal to MQ and report the message verification passed when A is equal to MQ.

21. The system of claim 20, wherein the message verifier to compute the value A comprises the message verifier to:
  divide dividing A and MQ into words;
  compute each word of A sequentially, wherein the words are computed in order of increasing significance; and
  terminate the computing for each word of A not equal to the word of MQ having the same significance.

* * * * *

UNITED STATES PATENT AND TRADEMARK OFFICE
CERTIFICATE OF CORRECTION

| | | |
|---|---|---|
| PATENT NO. | : 7,760,873 B2 | Page 1 of 1 |
| APPLICATION NO. | : 11/479100 | |
| DATED | : July 20, 2010 | |
| INVENTOR(S) | : Gueron et al. | |

It is certified that error appears in the above-identified patent and that said Letters Patent is hereby corrected as shown below:

In column 10, at line 6 delete, "MO" and insert --MQ--.

In column 10, at line 7 after, "MH" insert --, wherein MH is a result of a hash function with an original message MO as an argument; computing a redundancy value MR, wherein MR is a result of a redundancy function with MH as an argument; and transforming MR into the value MQ; computing a value S, wherein S is equal to the square root of MQ in modular arithmetic when the modulus is N; and computing a value q, wherein q is equal to the largest integer less than or equal to the quotient of S squared divided by N--.

In column 12, at line 30 after, "divide" delete "dividing".

Signed and Sealed this
First Day of February, 2011

David J. Kappos
*Director of the United States Patent and Trademark Office*